3,057,818
RUBBER PRODUCTS RESISTANT TO RADIATION
DAMAGE
Herbert R. Anderson, Jr., Bartlesville, Okla., assignor to Phillips Petroleum Company, a corporation of Delaware
No Drawing. Filed Oct. 2, 1959, Ser. No. 843,925
5 Claims. (Cl. 260—45.7)

This invention relates to rubber products resistant to radiation damage.

The word "rubber" as used herein includes both natural and synthetic rubbery materials.

Rubber vulcanizates, when subjected to ionizing radiation, undergo deterioration in stress-strain properties, this being due to chain scission and cross linking. For instance, when some vulcanizates are subjected to radiation, such as alpha rays, beta rays, gamma rays, or neutrons, there is a considerable increase in the modulus of the product and the number of network chains, related to cross links, is increased. Other vulcanizates, when subjected to the same radiation, are degraded to softer and even liquid products. Such changes are undesirable in either case because the physical properties of the rubber are harmed by this radiation.

I have discovered that diaryl substituted acetylenes and polyaryl substituted ethylenes wherein the aryl groups are directly attached to carbon atoms joined by the unsaturated linkage can be added to rubber in order to improve the resistance of the rubber to radiation damage.

The following, therefore, are objects of this invention.

An object of my invention is to provide rubber vulcanizates which are resistant to radiation damage. A further object of my invention is to provide compositions containing certain additives which make the product exhibit less change in modulus than the same product without the additive. A further object if this invention is to provide a method of reducing damage to rubber when subjected to ionizing radiation.

Other objects and advantages of my invention will be apparent to one skilled in the art upon reading this disclosure.

Specific examples of the aryl substituted ethylenes and acetylenes include the following: diphenylacetylene, di-(2-naphthyl)acetylene, di-(1-anthryl)acetylene, di-(2-biphenylyl)acetylene, phenyl-1-naphthylacetylene, phenyl-2-anthrylacetylene, phenyl-9-anthrylacetylene, phenyl-3-biphenylylacetylene, bis-(4-aminophenyl)acetylene, bis-(o-tolyl)acetylene, bis-(p-tolyl)acetylene, bis-(2-amino-p-tolyl)acetylene, bis-(3-methoxyphenyl)acetylene, bis-(4-ethoxyphenyl)acetylene, bis-(4,5-dimethyl-2-naphthyl)acetylene, bis-(8-propoxy-1-naphthyl)acetylene, bis-(2,2'-dimethyl-4-biphenylyl)acetylene, bis-(4'-amino-4-biphenylyl)acetylene, 1,2-diphenylethylene, 1,1,2-triphenylethylene, tetraphenylethylene, 1,2-bis-(4-aminophenyl)ethylene, 1,2-bis-(3,5-diethylphenyl)ethylene, 1,2-bis-(m-tolyl)ethylene, 1,1,2-tris-(o-tolyl)ethylene, 1,2-bis-(4-amino-o-tolyl)ethylene, 1,1-bis-(2-methoxyphenyl)ethylene, 1,2-bis-(2-methyl-4-ethoxyphenyl)ethylene, 1,1-bis-(2-biphenylyl)ethylene, 1,2-bis-(3-biphenylyl)ethylene, 1,2-bis-(2',4'-dimethyl-4-biphenylyl)ethylene, 1,2-bis-(4'-amino-4-biphenylyl)ethylene, 1,2-bis-(2-anthryl)ethylene, 1,2-bis-(9-anthryl)ethylene, 1,2-bis-(9,10-dimethyl-1-anthryl)ethylene, 1,2-bis-(1-naphthyl)ethylene, 1,2-bis-(2-naphthyl)ethylene, 1,2-bis-(3,6,7-trimethyl-2-naphthyl)ethylene, 1,2-bis-(7-amino-2-naphthyl)ethylene, 1-phenyl-2-(2-naphthyl)ethylene, and 1-phenyl-2-(3-biphenylyl)ethylene.

As is evident from this list of compounds, the aryl groups are directly attached to the carbon atoms joined by the unsaturated linkage but that other substituents can be present in the molecule. Obviously, other substituents such as amino groups, alkyl groups, alkoxy groups, etc. can be present. It is the presence of the aryl groups attached to the carbon atoms joined by the unsaturated linkage which produces the resistance to radiation damage.

The invention is applicable to all types of rubber, both natural and synthetic. The synthetic polymers include the groups prepared by polymerizing one or more conjugated dienes of 4 to 10 carbon atoms, either alone, or in combination with an unsaturated comonomer such as styrene, acrylonitrile, methacrylonitrile, methyl vinyl ether, methyl methacrylate, and the like. Generally, the conjugated diene, such as 1,3-butadiene, isoprene, hexadiene, etc., comprises a major amount of the monomer system. The invention is also applicable to polychloroprene and rubbers of the polyurethane and isocyanate types. For a more complete discussion of the various synthetic rubbers, attention is directed to Whitby, "Synthetic Rubber," published by John Wiley and Sons, Inc., New York, 1954.

The amount of additive employed will depend upon its compatibility in the rubber. It is generally in the range from 2 to 10 parts by weight per 100 parts rubber. While an amount in excess of 10 parts is seldom necessary, it is within the scope of the invention to increase the quantity as desired.

The following examples illustrate the improvement in radiation resistance produced by adding the particular ethylenes and acetylenes. These examples should be considered as illustrative and not as unduly limiting. In these examples, I have shown the improved results by tabulating the change in 100 percent modulus and the change in the density of network chains when the material is exposed to radiation. The absolute modulus figures can easily be obtained by adding the numerical value for the increase shown to the original figure which is the modulus prior to radiation. However the change in modulus and density of network chains gives a better measure of the effect of the radiation.

These examples illustrate that the products containing the additives described herein will protect the vulcanizing composition when it is exposed to ionizing radiation of $1 \times 10^5$ to $5 \times 10^8$ roentgens and that the composition, while increasing in modulus, does not increase to the same degree as the material without the additive. This provides a method of operating wherein a rubbery material is necessarily exposed to ionizing radiation.

*Example I*

A 75/25 butadiene/styrene rubber was prepared by emulsion polymerization at 41° F. to give a polymer having a raw Mooney value (ML–4 at 212° F.) of 52 and a bound styrene content of 23 percent. A recipe for the production of such a polymer is:

| | Parts by weight |
|---|---|
| 1,3-butadiene | 75 |
| Styrene | 25 |
| Water | 180 |
| Rosin soap, K salt | 4.5 |
| Tamol N [1] | 0.15 |
| $Na_3PO_4.12H_2O$ | 0.80 |
| p-Menthane hydroperoxide | 0.12 |
| $FeSO_4.7H_2O$ | 0.20 |
| $K_4P_2O_7$ | 0.30 |
| tert-Dodecyl mercaptan | As required for a 52 ML–4 polymer |

[1] Sodium salt of a naphthalene sulfonic acid condensed with formaldehyde.

This rubber was compounded with diphenyl acetylene as the inhibitor and a control was run with no inhibitor. The compounding recipe was as follows:

| | Parts by weight |
|---|---|
| Butadiene/styrene rubber | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |
| Inhibitor | 5 |

[1] Philblack O, high abrasion furnace black.
[2] A physical mixture containing 65 percent of a complex diarylamine-ketone reaction product and 35 percent of N,N'-diphenyl-p-phenylenediamine.
[3] N-cyclohexyl-2-benzothiazylsulfenamide.

The stocks were roll milled, sheeted off the mill, and cured 45 minutes at 307° F. Tensile specimens ⅛" wide and 2" long (length of test portion) were cut from the sheets which were 25–30 mils in thickness. Swell specimens ½" x 1" were also cut from the sheets. The specimens were packed into aluminum cans which were closed, purged with helium, and irradiated in a field of gamma rays from spent fuel elements from the Materials Testing Reactor at Arco, Idaho, at a canal temperature of approximately 75° F. A pressure of 25 pounds helium was maintained in the cans during irradiation. Runs were made with total dosages of 0.5 and $1 \times 10^8$ roentgens. One set of samples was not irradiated but was reserved for control purposes. The irradiated materials were removed from the gamma ray field and physical properties were determined. Results were as follows:

| | Inhibitor | |
|---|---|---|
| | Diphenyl-acetylene | Control |
| 100% Modulus, p.s.i.: | | |
| Original | 320 | 390 |
| Increase after nominal radiation dose (10⁸ roentgens): | | |
| 0.5 | 650 | 930 |
| 1 | 1,210 | 2,100 |
| Density of network chains × 10⁴ (moles/cc.) [1]: | | |
| Original | 1.53 | 1.60 |
| Increase after nominal radiation dose (10⁸ roentgens): | | |
| 0.5 | 1.79 | 2.40 |
| 1 | 2.77 | 3.60 |

[1] The density of network chains, $\nu$, is related to the number of crosslinks by the function $$\nu = 2n - \frac{2\delta}{M}$$

where $n$ is the number of crosslinks, $\delta$ is the density of the polymer, and $M$ is the molecular weight.

*Example II*

The procedure of Example I was followed except that the inhibitor was 1,2-diphenylethylene (trans-stilbene). Five parts by weight of the inhibitor per 100 parts rubber was used. The change in 100 percent modulus upon irradiation of the rubber with and without inhibitor was as follows:

| | Sample Containing Inhibitor | Control |
|---|---|---|
| 100% Modulus, p.s.i.: | | |
| Original | 300 | 400 |
| Increase after nominal radiation dose (10⁸ roentgens) | | |
| 0.5 | 660 | 1,020 |
| 1 | 1,220 | 2,470 |

*Example III*

The procedure of Example I was followed except that the inhibitor was 1,2-bis(biphenylyl)ethylene. Five parts by weight of the inhibitor per 100 parts of rubber was used. The following data were obtained after a portion of this material was irradiated with a total dosage of $1 \times 10^8$ roentgens. The control is the same as that of Example I:

| | Inhibitor, 1,2-bis (biphenylyl)-ethylene | Control |
|---|---|---|
| 100% Modulus, p.s.i.: | | |
| Original | 400 | 390 |
| Increase after dose of $1 \times 10^8$ roentgens | 1,540 | 2,100 |
| Density of network chains × 10⁴ (moles/cc.): | | |
| Original | 1.72 | 1.60 |
| Increase after dose of $1 \times 10^8$ roentgens | 2.98 | 3.60 |

Each of the above examples show that the inhibitors of this invention, when added to rubber, produce compositions which are far more radiation resistant than the rubber without the additive.

As many possible embodiments can be made of this invention without departing from the scope thereof, it is to be understood that all matter herein set forth is to be interpreted as illustrative and not as unduly limiting the invention.

I claim:

1. A composition comprising rubber and a minor amount of a compound selected from the group consisting of acetylenes and ethylenes containing at least two aryl groups directly attached to the carbon atoms joined by the unsaturated linkage.

2. A composition comprising a rubbery copolymer of 1,3-butadiene and styrene and, based on 100 parts by weight of said copolymer, 2 to 10 parts of a compound selected from the group consisting of acetylenes and ethylenes containing at least two aryl groups directly attached to the carbon atoms joined by the unsaturated linkage.

3. A composition comprising a rubbery copolymer of 1,3-butadiene and styrene and, based on 100 parts by weight of said copolymer, 2 to 10 parts of diphenylacetylene.

4. A composition comprising a rubbery copolymer of 1,3-butadiene and styrene and, based on 100 parts by weight of said copolymer, 2 to 10 parts of 1,2-bis(biphenylyl)-ethylene.

5. A composition comprising a rubbery copolymer of 1,3-butadiene and styrene and, based on 100 parts by weight of said copolymer, 2 to 10 parts of 1,2-diphenylethylene.

References Cited in the file of this patent

UNITED STATES PATENTS

| 2,241,770 | Dreisbach et al. | May 13, 1941 |
| 2,290,547 | Dreisbach et al. | July 21, 1942 |
| 2,876,210 | Wynn et al. | Mar. 3, 1959 |